United States Patent [19]

Pasma

[11] Patent Number: 4,768,142
[45] Date of Patent: Aug. 30, 1988

[54] POWER-SUPPLY CIRCUIT

[75] Inventor: Andries C. Pasma, Drachten, Netherlands

[73] Assignee: U.S. Philips Corporation, New York, N.Y.

[21] Appl. No.: 910,102

[22] Filed: Sep. 22, 1986

[30] Foreign Application Priority Data

May 15, 1986 [NL] Netherlands ............... 8601241

[51] Int. Cl.⁴ .............................. H02M 7/155
[52] U.S. Cl. .............................. 363/89; 363/124
[58] Field of Search ............ 363/89, 124, 126; 318/139; 361/18

[56] References Cited

U.S. PATENT DOCUMENTS

| 4,001,668 | 1/1977 | Lewis | 363/89 X |
| 4,034,281 | 7/1977 | Morita et al. | 363/124 X |
| 4,641,233 | 2/1987 | Roy | 363/89 |

FOREIGN PATENT DOCUMENTS 0055429 4/1982 Japan ................... 363/89

Primary Examiner—Patrick R. Salce
Assistant Examiner—Kristine Peckman
Attorney, Agent, or Firm—Thomas A. Briody; David R. Treacy; Bernard Franzblau

[57] ABSTRACT

A power supply circuit which maintains the voltage across a first capacitor ($C_1$) substantially constant over a wide range of mains voltages, the capacitor ($C_1$) energizes a motor (M) and is charged during the rising edges of the applied mains voltage in that above a specific input voltage ($U_{min}$) a first transistor ($T_1$) is turned on via a second capacitor ($C_2$) and a first resistor ($R_2$). When the rectified mains voltage at the output of a diode ($D_1$) exceeds a specific value ($U_2$) defined by a first zener diode ($Z_2$), a second transistor ($T_2$) is turned on. Consequently, the first transistor is turned off. When the first transistor ($T_1$) is cut off, the first capacitor is discharged through the motor. The second capacitor is then discharged via a second zener diode ($Z_1$) and prevents the first transistor from being turned on.

22 Claims, 2 Drawing Sheets

POWER-SUPPLY CIRCUIT

BACKGROUND OF THE INVENTION

This invention relates to a power-supply circuit for energizing a load and comprises two input terminals for the application of an input voltage. Coupled to the input terminals are a rectifier, a first capacitor having terminals for the connection of the load, a first transistor switch having a control electrode, and second transistor switch for turning off the first transistor switch when the rectified input voltage exceeds a specific value.

Such a circuit is suitable for energizing a load with different input voltages. Such a circuit is particularly suitable for use in a dryshaver in which the circuit is utilized for energizing the motor. This enables the shaver to be used with different mains voltages available in various countries without the need for an adaptor or switching over.

Such a circuit is known from U.S. Pat. No. 4,001,668. In this circuit the first capacitor is maintained at an average constant voltage in that both during the rising edge and the falling edge of the rectified input voltage the first capacitor is recharged to the value of the rectified input voltage defined by the second transistor switch. A drawback of this circuit is that it generates a comparatively large amount of spurious radiation. This is because during the falling edge of the rectified input voltage the first transistor switch is turned on at the value of the input voltage defined by the second transistor switch, while at this instant the voltage across the first capacitor is lower than this value. As a result of this, the first capacitor is charged with a comparatively large charging current, so that the voltage across this capacitor increases stepwise to the value of the rectified input voltage defined by the second transistor switch.

SUMMARY OF THE INVENTION

Therefore, it is an object of the invention to provide a power-supply circuit which produces practically no spurious radiation. According to the invention a power-supply circuit of the type defined in the opening paragraph is characterized in that the control electrode of the first transistor switch is coupled to one input terminal by a second capacitor and the other input terminal by at least one diode. During the rising edges of the input voltage the first transistor switch is turned on by the charging current of the second capacitor, and during the falling edges the second capacitor discharges through the diode so that the first transistor switch is kept in the non-conductive state. As a result, the first capacitor is charged only during the rising edges of the rectified input voltage. The voltage across the first capacitor then follows the gradual increase of the input voltage, which precludes the occurrence of spurious radiation. Moreover, as compared with the known circuit, the second capacitor reduces the dissipation in the control circuit of the first transistor switch.

A first embodiment of the invention is characterized in that the circuit comprises first protection means for turning off the first transistor switch when a specific current through the load is exceeded. For example, in the event of a short-circuit of the load the first protection means turn off the first transistor switch in order to prevent said transistor switch from being damaged by an excessive current. The first protection means may be characterized further in that it comprises a resistor which is arranged in series with the load and which is coupled to the control electrode of the second transistor switch by at least a first reference-voltage element.

A second embodiment of the invention is characterized in that the circuit comprises second protection means for turning off the first transistor switch when a specific current through the first capacitor is exceeded. The second protection means prevent the first transistor switch from being damaged by an excessive charging current when the power-supply circuit is switched on in the case of a large instantaneous value of the rectified input voltage and in the case of voltage transients. In a further embodiment these second protection means may be characterized further in that they comprise a resistor which is arranged in series with the first transistor switch, and which is coupled to the control electrode of the second transistor switch by at least one diode.

A third embodiment of the invention is characterized in that the circuit comprises a correction device for increasing the value of the rectified input voltage above which the second transistor switch turns off the first transistor switch when the load current increases. By means of the correction device the first capacitor is charged to a voltage which increases as the load current increases in order to ensure that the average voltage across this capacitor and hence across the load, increases.

In a further embodiment, if the control electrode of the second transistor switch is coupled to an output of the rectifier by a series arrangement of at least one zener diode and a resistor, the correction device may comprise a transistor whose base and emitter are connected to the terminals of a resistor arranged in series with the load and whose collector is connected to the junction point between the zener diode and the resistor in the series arrangement between the control electrode of the second transistor switch and the output of the rectifier. A further embodiment may be characterized in that the correction device comprises limiting means for limiting the correction provided by the correction circuit above a specific load current.

BRIEF DESCRIPTION OF THE DRAWINGS

Embodiments of the invention will now be described in more detail, by way of example, with reference to the accompanying drawings, in which.

DESCRIPTION OF THE PREFERRED EMBODIMENTS

Figure 1:
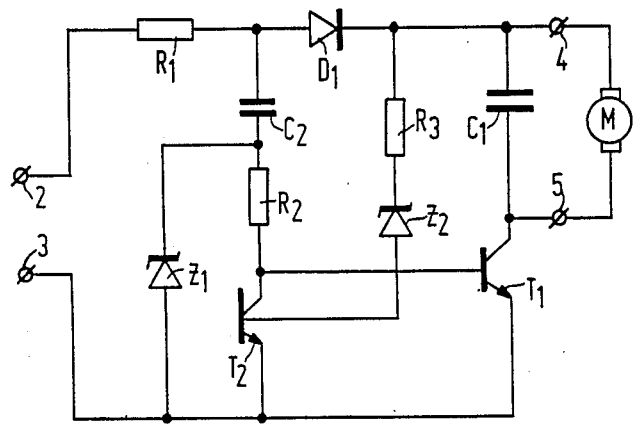
FIG. 1 shows the basic diagram of a power-supply circuit in accordance with the invention.

FIG. 1 shows the basic diagram of a power-supply circuit in accordance with the invention. Between the two terminals 2 and 3 for the application of the mains voltage the circuit comprises a series arrangement of a resistor $R_1$, a rectifier, which in the present example comprises a diode $D_1$, a first capacitor $C_1$ having terminals 4 and 5 for connecting a load which in the present example comprises a motor of, for example, a dryshaver, and a first transistor switch which in the present example comprises a single transistor $T_1$. By means of the series arrangement of a resistor $R_2$ and the capacitor $C_2$ the control electrode of this transistor $T_1$ is connected to the anode of the rectifier $D_1$. The junction point between the resistor $R_2$ and the capacitor $C_2$ is connected to the input terminal 3 via a zener diode $Z_1$. The circuit further comprises a second transistor switch, which in the present example comprises a transistor $T_2$ whose collector-emitter path is arranged in parallel with the base-emitter junction of the transistor $T_1$. The control electrode of transistor $T_1$ is connected to the cathode of the rectifier $D_1$ by means of a series arrangement of a zener diode $Z_2$ and a resistor $R_3$.

Figure 2:
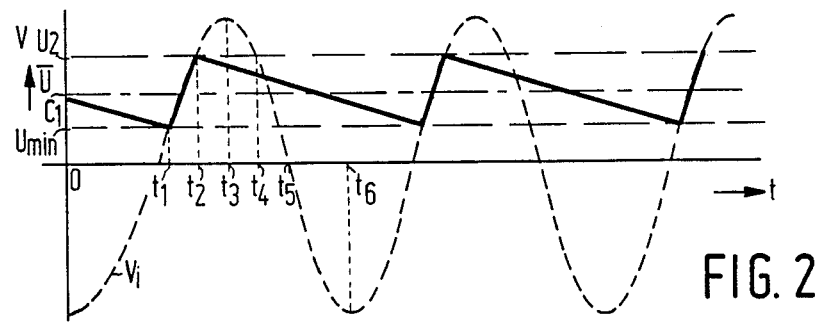
FIG. 2 shows some voltage characteristics to explain the operation of the circuit shown in FIG. 1.

The operation of the circuit will now be explained with reference to FIG. 2, which illustrates how the voltages at various points in the circuit vary. The sinusoidal mains voltage $V_i$ applied between the input terminals 2 and 3 is shown in broken lines in FIG. 2. During the rising edge in the time interval $O-t_3$ of this mains voltage the capacitor $C_2$ is charged, the charging current flowing from the input terminal 2 to the input terminal 3 via the resistor $R_1$, the capacitor $C_2$, the resistor $R_2$ and the base-emitter junction of the transistor $T_1$. The base current of the transistor $T_1$ is then limited by the resistor $R_2$ and by the zener diode $Z_1$, which is turned on above a specific value of the voltage across this resistor and directly drains the charging current to the input terminal 3. Initially there is no current in the collector line of the transistor $T_1$ because the rectifier diode $D_1$ is cut off as a result of the voltage still present across the capacitor $C_1$. In this time interval the capacitor $C_1$ is discharged through the load M. At the instant $t_1$ the instantaneous value of the mains voltage becomes higher than the voltage $U_{min}$ across the capacitor $C_1$, so that the rectifier diode $D_1$ is turned on. As a result of this, the capacitor $C_1$ is charged, the charging current flowing from the input terminal 2 to the input terminal 3 via the resistor $R_1$, the diode $D_1$, the capacitor $C_1$ and the collector-emitter path of the transistor $T_1$. The charging current is then limited by the resistor $R_1$. The voltage across the capacitor $C_1$ now increases in conformity with the increase of the mains voltage $V_i$. At the instant $t_2$ when the rectified input voltage has an instantaneous value $U_2$ the zener diode $Z_2$ and the transistor $T_2$ are driven into conduction. This causes the transistor $T_1$ to be cut off so that the capacitor $C_1$ is not charged any further and the maximum voltage across this capacitor is consequently equal to the voltage $U_2$. The transistor $T_2$ remains conductive until at the instant $t_4$ the instantaneous value of the rectified input voltage becomes smaller than the voltage $U_2$. In the time interval $t_2-t_3$ the capacitor $C_2$ is charged to the peak value of the input voltage, the charging current flowing through the collector-emitter path of the transistor $T_2$. During the falling edge of the mains voltage in the time interval $t_3-t_6$ the capacitor $C_2$ is discharged completely via the zener diode $Z_1$ which now operates as a diode, thus preventing the transistor $T_1$ from being turned on. The transistor $T_1$ is turned on again if during the next rising edge, the instantaneous value of the mains voltage exceeds the capacitor voltage $U_1$. When the load is constant the average value $Uc_1$ of the voltage across the capacitor $C_1$ is thus maintained constant in the above manner. The operation of the circuit is then independent of the mains-voltage amplitude over a wide range.

Figure 3:
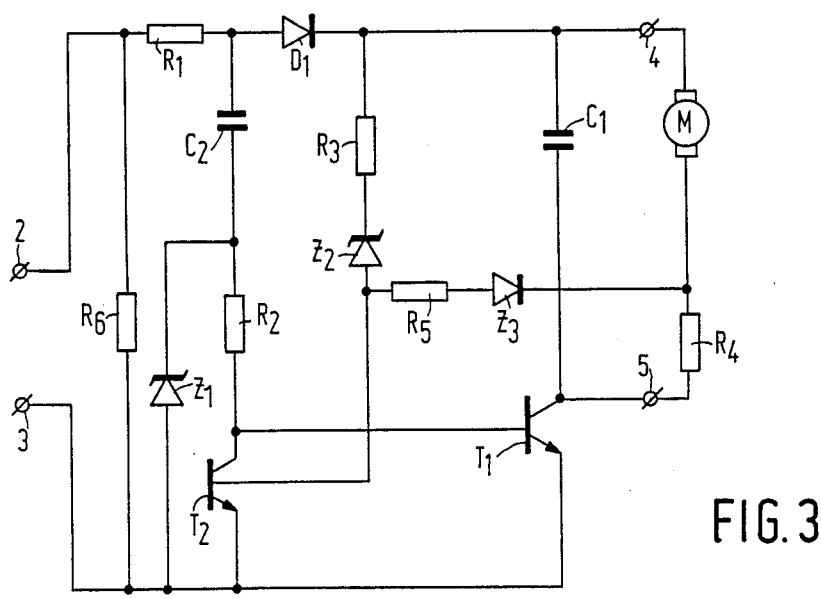
FIG. 3 shows a first embodiment of the invention.

FIG. 3 shows a first embodiment of the invention, identical parts bearing the same reference numerals as in FIG. 1. In this embodiment a resistor $R_4$ is arranged in series with the load M, the junction point between this resistor $R_4$ and the load M being connected to the control electrode of the transistor $T_2$ via the series arrangement of a zener diode $Z_3$ and a resistor $R_5$. These additional elements constitute the first protection means which turn off the power-supply circuit in the event of, for example, a short-circuit of the motor or blocking of the motor. Above a specific value of the current through the load and hence above a specific value of the voltage across the resistor $R_4$, the zener diode $Z_3$ is turned on so that the transistor $T_2$ is turned on and consequently the transistor $T_1$ is turned off. The resistor $R_5$ then limits the base current of the transistor $T_2$. During normal operation of the circuit the protection means have another advantage. If the transistor $T_2$ turns off the transistor $T_1$, the collector voltage of the latter increases. This increase is transferred to the base of the transistor $T_2$ via the resistor $R_4$, the zener diode $Z_3$ and the resistor $R_5$, resulting in a positive-feedback effect which causes the transistor $T_1$ to be turned off very rapidly.

In this embodiment a negative voltage-dependent resistor $R_6$ is arranged between the input terminals 2 and 3 to limit the input voltage to, for example, 600 V.

Figure 4:
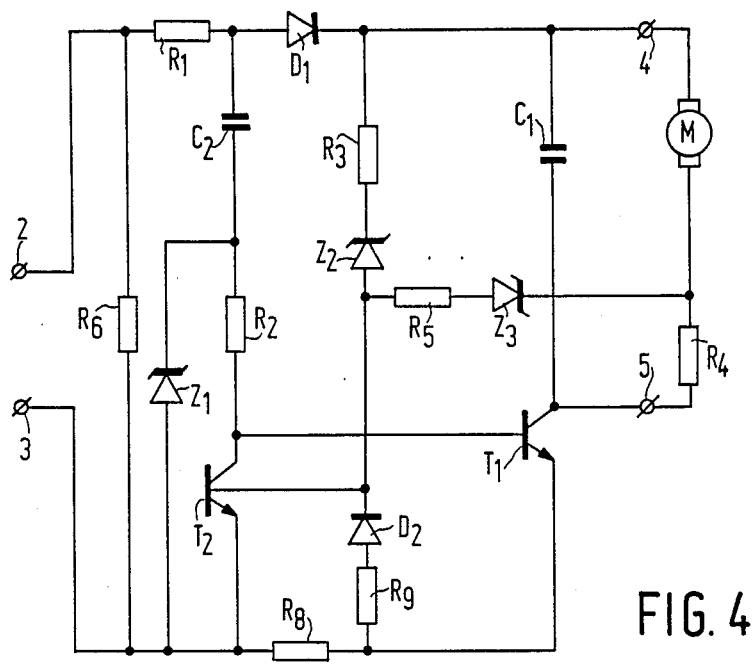
FIG. 4 shows a second embodiment of the invention.

FIG. 4 shows a second embodiment of the invention, in which identical parts bear the same reference numerals as in FIG. 3. In this embodiment a resistor $R_8$ is arranged in the emitter line of the transistor $T_1$ and the emitter of the transistor $T_1$ is connected to the base of the transistor $T_2$ via the series arrangement of a resistor $R_9$ and a diode $D_2$. These elements constitute the second protection means which turn off the power-supply circuit in the event of an excessive charging current through the transistor $T_1$. If the power-supply circuit is switched on, for example, at the instant at which the mains voltage has its maximum value, the transistor $T_1$ is turned on rapidly via the capacitor $C_2$. At this instant the capacitor $C_1$ is still without charge so that a very large charging current flows through the transistor $T_1$, which current is limited only by the resistor $R_1$. The transistor $T_1$ is now protected in that above a specific current the voltage across the resistor $R_8$ becomes so high that the transistor $T_2$ is turned on via the resistor $R_9$ and the diode $D_2$ and, consequently, the transistor $T_1$ is cut off. The resistor $R_9$ then limits the base current of the transistor $T_2$.

Figure 5:
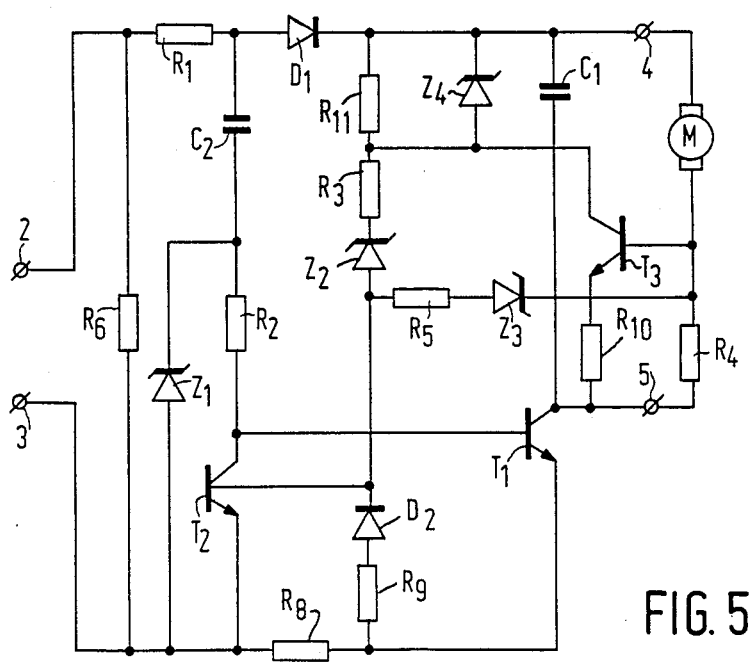
FIG. 5 shows a third embodiment of the invention.

FIG. 5 shows a third embodiment of the invention, in which identical parts bear the same reference numerals as in FIG. 4. As the load of the motor M increases the capacitor $C_1$ is discharged to an increasing extent, so that the average voltage across this capacitor decreases. This causes the speed of the motor to decrease. In order to maintain the speed of the motor as constant as possible for an increasing load, the average voltage across the capacitor $C_1$ should also increase with the increasing load. For this purpose the power-supply circuit comprises a correction circuit comprising a transistor $T_3$ whose base-emitter junction, in series with a resistor $R_{10}$, is arranged in parallel with the resistor $R_4$ and whose collector is connected to the cathode of the rectifier diode $D_1$ via a resistor $R_{11}$. The series arrangement of the zener diode $Z_2$ and the resistor $R_3$ is connected to the collector of the transistor $T_3$. The correction circuit operates as follows. As the motor current increases and consequently the voltage across the resistor $R_4$ increases, the transistor $T_3$ is driven further into conduction, causing the voltage across the resistor $R_{11}$ to increase further. As a result of this, the voltage across the series arrangement of the resistor $R_3$, the zener diode $Z_2$ and the base-emitter junction of the transistor $T_2$ decreases, so that the zener diode $Z_2$ and the transistor $T_2$ are turned on at an increasingly higher instantaneous value of the input voltage. Consequently, the transistor $T_1$ is turned off at an increasing instantaneous value of the input voltage, so that the capacitor $C_1$ is charged to a voltage which increases as the load current increases. A zener diode $Z_4$ arranged in parallel with the resistor $R_{11}$ limits the voltage across the resistor $R_{11}$ above a specific load current. This ensures that the voltage across the capacitor $C_1$ cannot become higher than the maximum permissible motor voltage at increasing load current.

The invention is not limited to the embodiments described herein but to those skilled in the art, many modifications are conceivable within the scope of the present invention. For example, the first and the second transistor switches may comprise Darlington transistors or other compound transistors. Instead of bipolar transistors, field-effect transistors may be used, in which case base, collector and emitter should read gate, source and drain respectively. Further, the zener diode $Z_1$ may be replaced by one or more series-connected diodes. The first and the second protection means may also be constructed in another manner and, in particular, the current-sensing resistors for measuring the load current and the charging current may be arranged at other locations in the circuit. Further, the transistor in the correction circuit may be replaced by any other amplifier circuit. Finally, it is to be noted that the rectifier may alternatively comprise a full-wave rectifier or a bridge rectifier.

What is claimed is:

1. A power-supply circuit for energizing a load, comprising: two input terminals for the application of an input voltage to the circuit, means coupling a rectifier, a first capacitor having terminals for the connection of the load and a first controlled transistor switch to said two input terminals, a second transistor switch for turning off the first transistor switch when a rectified input voltage exceeds a specific value, and means coupling a control electrode of the first transistor switch to one input terminal via a second capacitor and to the other input terminal via at least one diode, the second capacitor being periodically discharged via the one diode.

2. A power-supply circuit as claimed in claim 1, characterized in that the one diode is a zener diode.

3. A power-supply circuit as claimed in claim 1 further comprising a resistor connected in series with the second capacitor.

4. A power-supply circuit as claimed in claim 1, characterized in that the circuit further comprises first protection means for turning off the first transistor switch when a specific current through the load is exceeded.

5. A power-supply circuit as claimed in claim 4, characterized in that the first protection means comprise a resistor connected in series with the load and coupled to a control electrode of the second transistor switch via at least a first reference-voltage element.

6. A power-supply circuit as claimed in claim 5, characterized in that a resistor is connected in series with the first reference-voltage element.

7. A power-supply circuit as claimed in claim 5 characterized in that the first reference-voltage element comprises a zener diode.

8. A power-supply circuit as claimed in claim 4, characterized in that the circuit comprises second protection means for turning off the first transistor switch when a specific current through the first capacitor is exceeded.

9. A power-supply circuit as claimed in claim 8, characterized in that the second protection means comprise a resistor connected in series with the first transistor switch and coupled to a control electrode of the second transistor switch via at least one further diode.

10. A power-supply circuit as claimed in claim 9, characterized in that a further resistor is connected in series with the further diode.

11. A power-supply circuit as claimed in claim 1 characterized in that the circuit comprises a correction device for increasing the value of the rectified input voltage above which the second transistor switch turns off the first transistor switch when the load current increases.

12. A power-supply circuit as claimed in claim 11, characterized in that a control electrode of the second transistor switch is coupled to an output of the rectifier by a series arrangement of at least one zener diode and a first resistor and in that the correction device comprises a third transistor whose base and emitter are connected to the terminals of a second resistor connected in series with the load and whose collector is connected to a junction point between the zener diode and the first resistor.

13. A power-supply circuit as claimed in claim 12, characterized in that the correction device comprises limiting means for limiting the correction provided by the correction circuit above a specific load current.

14. A power-supply circuit as claimed in claim 13, characterized in that a second zener diode is connected between the collector of the third transistor and the output of the rectifier.

15. A dry-shaving apparatus comprising a motor coupled to the first capacitor terminals of a power-supply circuit as claimed in claim 1, the load being constituted by the motor of the apparatus.

16. A power supply circuit for supplying electric energy to a load comprising:
first and second input terminals for connection to a source of AC supply voltage for the circuit,
first means coupling a current rectifying means to at least one of said input terminals to produce a periodic unidirectional voltage at an output of the rectifying means,
second means coupling a first controlled transistor switch and a first capacitor to said output of the rectifying means,
means for connecting the load to said first capacitor,
a second controlled transistor switch coupled to a control electrode of the first transistor switch to turn-off the first transistor switch when the second transistor switch is turned on,
third means coupling a control electrode of the second transistor switch to said output of the rectifying means so that the second transistor switch is turned on when the voltage at said output exceeds a given voltage level, and
fourth means coupling the control electrode of the first transistor switch to the first input terminal via a second capacitor and to the second input terminal via at least one diode.

17. A power supply as claimed in claim 16, wherein the second capacitor has a charge path that includes a junction between the control electrode and one main electrode of the first transistor switch thereby to provide a turn-on current for the first transistor switch, and said second capacitor has a discharge path that includes said one diode.

18. A power supply circuit as claimed in claim 16, wherein the first transistor switch is turned on via a charge current flowing through the second capacitor during rising edges of the AC supply voltage and the first capacitor is charged via said first transistor switch from the voltage at the output of the rectifying means, and wherein said first capacitor supplies a discharge current to the load when the first transistor switch is turned off.

19. A power supply circuit as claimed in claim 16, wherein the first transistor switch is turned on via a charge current flowing through the second capacitor during rising edges of the AC supply voltage, said third coupling means including a volage-threshold element that breaks into conduction at a voltage level in the rising edges of the AC supply voltage that is higher than the voltage level at which the first transistor switch is turned on, thereby to turn on the second transistor switch and turn off the first transistor switch, said first capacitor being charged during the period that the first transistor switch is turned on and supplying a discharge current to the load during the period when the first transistor switch is turned off.

20. A power supply circuit as claimed in claim 16, wherein the second coupling means connects the first capacitor and the first transistor switch in a series circuit with the rectifying means across said input terminals, and wherein the second capacitor has a discharge path that includes said one diode, said discharge path being coupled to the control electrode of the first transistor switch to prevent turn-on of the first transistor switch during a discharge period of the second capacitor.

21. A power supply circuit as claimed in claim 16 further comprising:

a correction device responsive to load current so that when the amplitude of the AC supply voltage is increased, the correction device adjusts the voltage level at which the second transistor turns on to a higher voltage level.

22. A power supply circuit as claimed in claim 16, wherein said third coupling means includes a voltage-threshold element that breaks into conduction at a given voltage level on the rising edges of the AC supply voltage thereby to turn on the second transistor switch and turn off the first transistor switch independently of the amplitude of the AC supply voltage.

* * * * *